J. Buhrer.
Burning Pulverized Fuel.
No. 67,492. Patented Aug. 6, 1867.
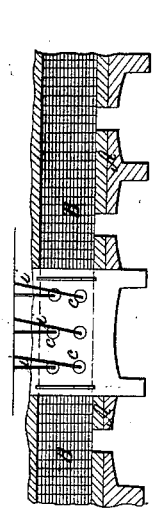
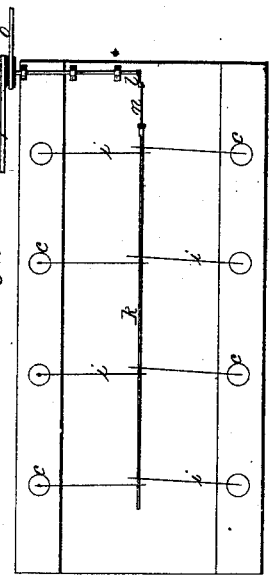
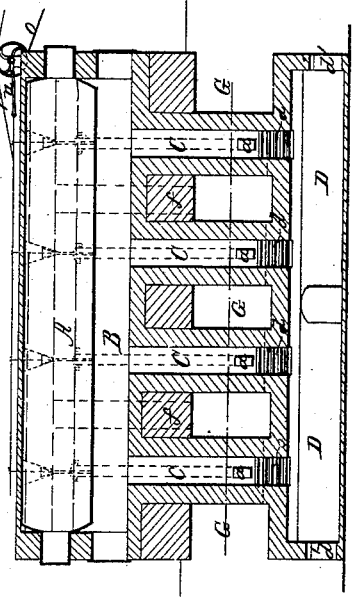
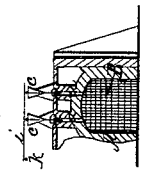
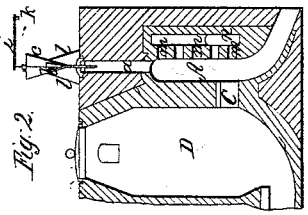
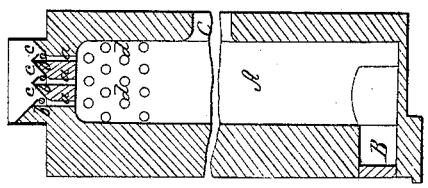
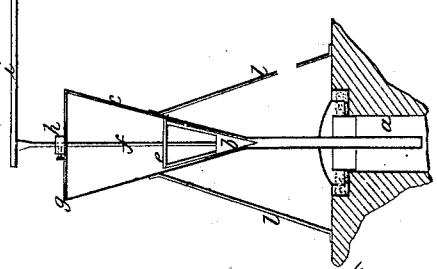
Witnesses:
W. Searle
John J. Tuder
Inventor,
F. Buhrer

United States Patent Office.

JACOB BUHRER OF MUNICH, BAVARIA.

Letters Patent No. 67,492, dated August 6, 1867.

---

IMPROVED APPARATUS FOR THE COMBUSTION OF FUEL.

---

The Schedule referred to in these Letters Patent and making part of the same.

---

TO WHOM IT MAY CONCERN:

Be it known that I, JACOB BUHRER, of Munich, in the Kingdom of Bavaria, have invented certain new and useful improvements in the Combustion of Fuel, and in the apparatus or means employed therein: and I hereby declare that the following is a full, clear, and exact description of the same.

This invention relates to an improved system or mode of effecting the combustion of fuel, and to the arrangement of apparatus for that purpose, and is applicable to the generation of steam; the burning of pottery, bricks, lime, and cement; the heating of the retorts for the manufacture of gas, and the heating of reverberatory furnaces employed in metallurgical and other operations.

These improvements consist, firstly, in the employment of any suitable solid fuel, in the powdered or finely-divided state, and causing it to fall or pass, in a continuous, or nearly continuous, stream or streams, into a suitable combustion-chamber supplied with heated or other air, so that the finely-divided fuel shall become intimately mixed with the air contained in the combustion-chamber, and be ignited whilst in the act of falling; secondly, in the employment of self-acting mechanical contrivances for insuring a continuous, or nearly continuous, supply of the finely-divided fuel to the combustion-chamber; thirdly, in the employment of stops or obstructions in the combustion-chamber, with a view to the checking or retarding of the descent of the finely-divided fuel through the combustion-chamber, and thereby insuring its complete combustion before reaching the bottom or inferior portion of the chamber; fourthly, in the substitution of an exhaust-fan for the usual chimney, and driving such fan from the machinery which drives the self-acting feed mechanism, that it shall always be driven at a speed proportionate to that of the apparatus which supplies the fuel, the object being to regulate the draught according to the amount of fuel supplied in a given time.

Figure 1 of the annexed sheets of drawings represents a vertical section of a combustion-chamber, suitable for heating an ordinary puddling or other reverberatory furnace, according to this invention, the furnace itself being omitted in the drawing, as forming no part of this invention.

A is the combustion-chamber, which may be of fire-brick, or lined with fire-brick, and of any convenient height, according to the amount of fuel to be consumed in a given time. It is provided with a fire-door, B, at the bottom, for the facility of introducing a small quantity of ordinary fuel, as hereinafter described, on starting the furnace. In the top of a combustion-chamber there is formed a number of inlets, $a\,a$, for the admission of the powdered fuel, the supply of which is regulated and maintained by means of any convenient self-acting feed apparatus, such, for example, as fluted rotating cylinders $b\,b$, situate at the bottom of one or more hoppers $c\,c$. The powdered fuel may be supplied to the hopper $c$ by means of an ordinary elevation. $d\,d$ are a number of fire-brick obstructions, built into the interior of the combustion-chamber and partially filling the same, with a view to checking or retarding the fall or descent of the powdered fuel in the combustion-chamber, and thereby insuring its perfect combustion by the time it reaches the floor of the chamber. The obstructions may be either solid or hollow, and, when made hollow or tubular, they may, in the case of furnaces for steam-generators, be composed of metal, and made to open at each end into the water space surrounding the combustion, so as to afford increased heating surfaces. In some cases tubular fire-clay obstructions may be employed with a view to the admission of air therein, such air being permitted to escape in the form of small jets or currents amongst the ignited descending fuel, through lateral perforations made in the tubes for that purpose. C is the opening which conducts the flame and heated products of combustion into the furnace or chamber where the elevated temperature is required, as, for example, into the body of a puddling or reverberatory furnace. The hot or cold air requisite for effecting the perfect combustion of the finely-divided fuel, during its descent, may be admitted into the combustion-chamber in any convenient manner, so long as care be taken to insure a complete and thorough admixture of the air with the fuel as it falls. In starting the furnace a sufficiently elevated temperature must first be obtained in the combustion-chamber, by lighting a fire in the bottom or lower portion thereof, to cause the ignition of the finely-divided fuel as it descends. The descending fuel having become ignited, will ignite the rest as fast as it is supplied, thereby producing a continuous combustion.

Figure 2 represents a sectional elevation, showing the adaptation of this system to pottery kilns.

A is the combustion-chamber, communicating by the aperture C with the interior of the kiln D. The finely-divided fuel is fed into the top of the combustion-chamber through apertures $a$, into each of which a pipe or tube opens from the bottom of a hopper, c, which is kept supplied with the finely-divided fuel in any convenient manner. The flow of the powdered fuel from the contracted lower part of the hopper is regulated by means of a conical plug, b, (shown more clearly in fig 3,) which is an enlarged sectional detail of one form of self-acting feeder, which I have found to answer well in practice. A species of open cage, e, is formed on the top of the plug, and a vertical central spindle, f, is secured thereto, such spindle passing through a cross-bar, g, on the mouth of the hopper, and being provided with a moveable collar, h, made adjustable along the spindle and resting upon the cross-bar. By suitably adjusting the position of this collar along the spindle, the conical plug b may be maintained at any desired elevation, so as to leave a larger or smaller orifice in the bottom of the hopper for the escape of the finely-divided fuel, according to the quantity of fuel to be fed into the combustion-chamber. In order to keep the fuel perfectly loose in the hopper, and to insure its free passage through the contracted orifice, a circular reciprocating motion is imparted to the plug b and cage e, by means of a lever-arm, i, fitted on to the upper end of the vertical spindle, and connected with a longitudinally reciprocating-rod, k, which is common to all the feeders, as shown in the plan, fig. 7, and hereinafter more fully referred to.

A sand-joint is made, as shown in Figure 3, at the part where the feeding-tube enters the inlet apertures a, for the purpose of preventing any escape from the combustion-chamber of the heated products of combustion at that part. l l are stays for supporting the hopper. Hot air obtained from regenerators, constructed and operating on the system adopted in Siemen's regenerative furnaces, is admitted into the combustion-chamber A, through the perforations m m, from the hot-air flue n, which communicates with the regenerators.

Figures 4 and 5 represent, respectively, a transverse vertical section and a sectional plan of a portion of a brick kiln, in which the firing is maintained by means of finely-divided fuel, supplied in a continuous manner by self-acting feeding mechanism situate above the kiln.

A is the body of the kiln, in which the bricks B are stacked, so as to leave interstices between them, and c c are the feeding-hoppers, communicating with the interior of the kiln by the passages a a. The longitudinally reciprocating-rod k imparts a vibratory circular motion to the several plugs in the hoppers, through the levers i, as hereinbefore described; and hence a series of small streams of finely-divided fuel is caused to descend upon and amongst the bricks, the fuel being ignited in its descent.

Figure 6 is a transverse vertical section, showing the application of this invention to a steam-generator.

Figure 7 is a plan of the top of the same; and

Figure 8 is a longitudinal vertical section.

In these figures, A represents a cylindrical boiler, the lower half of which is contained within the combustion-chamber B, whilst the upper part is covered or enclosed in fire-brick. From the bottom of the chamber B a number of perpendicular passages, C C, descend to the long combustion-chamber D, which should be primarily heated, by special fires lighted therein, to the desired temperature for effecting the ignition of the finely-divided fuel. a a are lateral inclined passages leading from the self-acting feeding-hoppers to the lower portion of the passages C, which passages may, if desired, be provided with stops or obstructions d d, for the purpose hereinbefore described. The several feeding-hoppers are constructed and arranged in precisely the same manner as shown in fig. 3, the plugs deriving their motion from the longitudinally reciprocating rod k, working on anti-friction rollers in the top or roof of the boiler-setting. l is a crank on the end of a driving-shaft, m, and connected by a connecting-rod, n, with one end of the rod k. On imparting a rotatory motion to the shaft m, by means of the belt o and driving-pulley, a to and fro motion will be imparted to the rod k, and the plugs of the several hoppers will be caused to reciprocate on their vertical axes, through the intervention of the levers i. These levers are engaged at their free ends between pins in the rod k, and when one or more are not required to operate they are simply disengaged from such pins. E E are lateral flues (shown in dotted lines in fig. 6) branching from each side of the upper part of the combustion-chamber B, and opening into the longitudinal flues F F. From the bottoms of these last-mentioned flues other perpendicular flues f (shown in dotted lines in figs. 6 and 8) descend to the passages G G, which, after uniting in one flue, may, if desired, communicate with Siemen's regenerators. The draught or supply of air is maintained by the aid of an ordinary exhaust-fan, in connection with the passages G G, but not shown in the drawings, such fan answering the purpose of a chimney; or, if preferred, an ordinary chimney-stack may be used. The fan for producing the draught is to be driven always in the same ratio with the self-acting feeders, and I prefer, therefore, that the same shaft m which drives the feeders shall transmit motion to the fan. By this means I am enabled to regulate the draught to the feed, so that the greater the supply of fuel the greater will be the draught or supply of air, and *vice versa*. p represents the pulley and driving-belt, which gives motion to the fan from the shaft m.

In working a furnace on this system, the several hoppers c are kept charged with the finely-divided fuel, either by manual labor or by self-acting elevators worked by the steam engine or prime mover. A fire or fires having been lighted in the lower combustion-chamber D, in order to elevate the temperature to a sufficient degree to ignite the finely-divided fuel, as it descends in continuous streams, the feeders in the hoppers are started, and with them the exhaust-fan. The powdered fuel now commences to flow down the several inclined passages a a into the lower part of the several vertical passages C C, where, meeting with the obstructions d, the fuel is divided or scattered preparatory to its entrance into the combustion-chamber D, in which it becomes ignited and consumed during its descent. The flame and heated gases arising from this combustion are carried by the draught up the passages C C into the upper combustion-chamber B, where they impinge against the bottom of the boiler A. The hot-air products of combustion are drawn off, through the flues E and F and f, to the passages G G, which conduct them either to regenerators, for the purpose of heating the supply of air to the lower combustion-chamber D, such air entering therein by the doors d' d', or direct to the exhaust-fan, or to the chimney. It will thus be seen that, so long as the feeders are kept in operation, a constant supply of powdered fuel will be fed into the chamber D, and a continuous flame will be emitted therefrom. The ash or debris which collects in the chamber D may be removed at intervals through doors therein.

*Claims.*

1. The employment of solid fuel in a fine state of division, and causing it to ignite during its descent through a suitable combustion-chamber, to which it is supplied in a continuous manner by self-acting feeding apparatus, substantially as and for the purpose hereinbefore described.

2. The application and use, to and in he combustion-chambers hereinbefore referred to, of stops or obstructions, for the purpose of checking or retarding the descent of the finely-divided fuel through such chambers, and insuring thereby its complete and perfect combustion.

3. The substitution of an exhaust-fan for the usual chimney, for creating a current or currents of air through the combustion-chambers hereinbefore referred to, when such fans are worked in concert with the several fuel-feeding apparatus, substantially as hereinbefore described.

In witness whereof I have signed my name to this specification in the presence of two subscribing witnesses.

JACOB BUHRER.

Witnesses:
 DOUGLAS J. NEWTON, 10 *Buchin Lane, London,*
 WILLIAM GOODRIDGE, *same place.*